United States Patent [19]

Strouss

[11] Patent Number: 4,547,388
[45] Date of Patent: Oct. 15, 1985

[54] PAN RELEASE AGENT AND ITS PREPARATION

[76] Inventor: Oran L. Strouss, Carson, Calif.

[21] Appl. No.: 620,529

[22] Filed: Jun. 12, 1984

Related U.S. Application Data

[60] Continuation of Ser. No. 388,432, Jun. 17, 1982, abandoned, which is a division of Ser. No. 191,278, Sep. 26, 1980, Pat. No. 4,339,465, which is a continuation-in-part of Ser. No. 85,127, Oct. 15, 1979, abandoned.

[51] Int. Cl.$^4$ .................. A21D 8/08; A23D 5/00; B01F 17/34
[52] U.S. Cl. .................. 426/609; 252/314; 252/356; 426/811
[58] Field of Search ............... 252/356, 314; 426/811, 426/609, 610, 611

[56] References Cited

U.S. PATENT DOCUMENTS

| | | | |
|---|---|---|---|
| 2,090,537 | 8/1937 | Lund | 252/356 X |
| 2,559,481 | 7/1951 | Truesdell | 426/609 |
| 2,793,123 | 5/1957 | Haas | 426/609 |
| 2,963,372 | 12/1960 | Brody et al. | 426/609 |
| 3,484,250 | 12/1969 | Vollink et al. | 426/293 |
| 3,507,665 | 4/1970 | Henthorn | 252/356 X |
| 3,785,993 | 1/1974 | Langhans | 252/356 |
| 3,859,445 | 1/1975 | Langhans | 426/24 |
| 3,906,117 | 9/1975 | Gawrilow | 426/811 X |
| 4,115,313 | 9/1978 | Lyon et al. | 426/811 X |
| 4,192,898 | 3/1980 | Hanson, Sr. | 426/609 X |

OTHER PUBLICATIONS

Product Featurette, Bakery, Sep. 1979, p. 212.
Proceedings of the 55th Annual Meeting, Amer. Soc. of Bakery Eng., 1979, pp. 57–64.
Tandem 552, Softener/Conditioner, ICI Americas Inc., Brochure 222-19, 9/79 2M.
Tandem 11H, Softener/Conditioner for Yeast-Raised Bakery Products, ICI Americas, Inc., Brochure 222-7 (LG-131), 5/75/300.
Tandem 552, ICI Americas, Inc., Brochure 5/78 500.

*Primary Examiner*—Richard D. Lovering
*Attorney, Agent, or Firm*—Lyon & Lyon

[57] ABSTRACT

A liquid composition for use as a pan-release agent in bakeries and a method of preparing such composition and depanning baked goods which comprises spraying onto a pan in which dough is to be baked a liquid composition comprising a liquid emulsifier containing monoglycerides, diglycerides, and polysorbate, and a major portion of water. Lecithin may also be added to the liquid composition, as well as certain preservatives. The present invention enables bakery products, particularly yeast-raised bakery products, to be easily released from the pans at the conclusion of the baking process and minimizes the build-up of carbon residue on the surfaces of the baking pans. The liquid composition does not affect the color of the baked dough and has a viscosity suitable for spraying through hydraulic or air pressure spray equipment. The liquid composition disclosed in the present invention can also be used to adhere a topping material, such as sesame seeds, onto yeast-raised bakery products without interfering with the release of the baked goods from the baking pans or adding to a build-up of carbon residue.

13 Claims, No Drawings

PAN RELEASE AGENT AND ITS PREPARATION

CROSS-REFERENCE TO RELATED APPLICATION

This application is a continuation of application Ser. No. 388,432 filed June 17, 1982, now abandoned, which was a divisional of application Ser. No. 191,278 filed Sept. 26, 1980, issued U.S. Pat. No. 4,339,465, which was a continuation-in-part of application Ser. No. 085,127 filed Oct. 15, 1979, now abandoned.

BACKGROUND OF THE INVENTION

The present application is directed, in general, to a liquid composition for use as a pan-release agent in bakeries, method of preparing same, and a method of de-panning baked goods. More specifically, the present invention describes the application of a liquid composition comprising a liquid emulsifier and water to the baking surfaces of pans for ease of product release and to prevent the build-up of carbon residue on the pan surfaces.

One of the problems which continuously plagues the baking industry is the formation of carbon residue on the surfaces of the baking pan. This residue is primarily due to the use of pan release agents known in the art, such as the edible oils of cottonseed, soybean, coconut, palm, corn, or similar oils, either alone or in combination with refined mineral oil. Commercial grade animal fats in the form of lard or tallow are also commonly used. However, all of these known pan release agents, when subjected to the temperatures of 300° F. to 500° F. necessary in commercial baking, leave a carbon residue on the pan surface which is not readily removable. This carbon residue interferes with the ease of release of the bakery product from the pan and damages the silicone glaze found on the surface of most baking pans. Consequently, bakeries must periodically have the carbon residue commercially removed from the baking pans and the silicone glaze reapplied to the pan surfaces. Not only is this reglazing process itself expensive, but the bakery must quite often, either reduce its production or invest in additional pans to be used while a portion of their pans are being reglazed. Also, since the carbon residue is a result of combustion, smoke and other pollutants are undesirably released inside the bakery during the baking process.

A related problem in the art occurs whenever it is necessary to place a topping on the baked goods. Bakeries have for many years produced buns and rolls that are topped with such things as sesame seeds, poppy seeds, wheat bran, oat flakes, and the like. However, the oils used as pan release agents cannot be used to adhere a topping material onto the dough. Thus, to make certain that these topping materials will adhere to the tops of the dough, water at hydrant pressure is sprayed onto the dough as it lies in the silicone-coated baking pans just prior to the depositing of the topping material onto the dough. It is believed, however, that raw water, applied in such a manner, causes accelerated deterioration of the silicone coating on the pans. Moreover, flour, seeds, dust, etc., adhere to the wet pan surface, causing a "soil build-up" which leads to the formation of a carbon residue. As a result, the baked dough begins to stick in the pans, causing damaged rolls or "cripples" and leading to the premature recoating of the pans.

A liquid emulsifier which contains monoglycerides, diglycerides, a polysorbate and a limited amount of water is known in the baking industry. See, for example, U.S. Pat. Nos. 3,785,993 and 3,859,445. However, as described in these patents, such liquid emulsifiers are used as a dough conditioner and softener for uniformity of appearance and extended shelf life. They were developed by ICI Americas, Inc. to be used in conjunction with liquid shortenings utilized in continuous mixing processes. In particular, the described liquid emulsifiers cannot be applied directly to the dough surface in order to get a topping material to stick thereto. Such an application causes the normal "golden brown" color of the baked dough to become spotty or streaked with light and dark areas of color. This unappetizing effect is unacceptable in the baking industry, and such baked goods are uniformly rejected by a bakery for sale to the public. In addition, the amount of water in the described liquid emulsifiers is limited to between 5 and 21 percent by weight. Thus, due to former strict FDA requirements, recently rescinded, which placed an exact limit on the amount of emulsifier which could be added to a particular batch of dough, and as a result of the viscosity of the liquid emulsifiers, the practice of the industry has been to directly meter the liquid emulsifiers into the dough or meter them into the shortening. A typical method is described in the above-identified patents. The required control over the amount of emulsifier used could not be obtained with a spraying apparatus, nor could the liquid emulsifiers as described in the patents and as used in the industry be sprayed through hydraulic or air pressure spray equipment due to their viscosity. Thus, while the liquid emulsifiers disclosed in these patents are believed to be the only commercially available liquid emulsifiers known in the art, they are not known to have been used other than as a dough conditioner and softener for uniformity of appearance and extended shelf life.

SUMMARY OF THE INVENTION

The present invention provides a liquid composition for use as a pan release agent in bakeries, method of preparing same, and a method of de-panning baked goods. The bakery pans are sprayed with a liquid composition comprising a liquid emulsifier containing monoglycerides and diglycerides derived from animal fat or vegetable oils and a polysorbate compound, and a major portion of water by weight. In addition, unbleached liquid lecithin may be added to the liquid composition to aid its adherence to the walls of the baking pans, particularly high-walled pans such as bread pans. The liquid composition may also be sprayed directly onto the dough surface to adhere a topping material thereto throughout the baking process.

The method of the present invention results in the effective and easy removal of baked products and, particularly, yeast-raised goods from the pan baking surfaces, reduces the number of "cripples" or lost product, and reduces the build-up of residual carbon on the pan surfaces, thereby extending the time period between reglazing of the silicone pan surfaces. Moreover, the liquid composition does not affect the color of the baked dough, and has a viscosity suitable for spraying the liquid composition through hydraulic or air pressure spray equipment. Furthermore, the minimization of carbon residue decreases the amounts of smoke or other environmental pollution which are produced during the baking process, thereby having a favorable effect on the working environment of the workers, as well as on the environment as a whole.

It is, therefore, an object of this invention to provide a method for de-panning baked goods.

It is also an object of this invention to provide a liquid composition for use as a pan-release agent in bakeries.

It is a further object of this invention to provide a method of spraying a liquid composition onto a bakery pan which is effective as a releasing agent for removing the baked goods from the pan and minimizes the formation of carbon residue on the pan surface.

It is another object of this invention to provide a method of spraying a liquid composition comprising a liquid emulsifier and at least about 80% water by weight onto a baking pan as a releasing agent for the removal of the baked goods from the pan.

It is still another object of this invention to provide a method of spraying a liquid composition onto a bakery pan which is effective as a releasing agent, and which liquid composition can also be sprayed onto the dough surface of uncooked bakery products to adhere a topping material thereto before, during, and after the baking process.

It is still a further object of this invention to provide a method of spraying a liquid composition which is stable in solution over a period of time and in which all component parts are compatible, one with another, onto a baking pan as a releasing agent for the removal of the baked goods from the pan.

The manner in which these and other objects and advantages are achieved will become apparent from the detailed description of the preferred embodiment which follows.

DETAILED DESCRIPTION OF THE PREFERRED EMBODIMENT

The present invention provides a liquid composition for use as a pan-release agent in bakeries, method of preparing same, and a method of de-panning baked goods which comprises spraying onto the surfaces of a baking pan a liquid composition comprising a liquid emulsifier containing monoglycerides and diglycerides as derived from animal fats or vegetable oil or both and a polysorbate compound, and at least about 80% water by weight. Unbleached liquid lecithin as derived from soya oils may also be added to the liquid composition of the present invention in order to aid its adherence to the walls of a baking pan.

The liquid emulsifier used in the spraying composition is a mixture of monoglycerides, diglycerides, a polysorbate and a limited amount of water, and has the following general characteristics and specifications:

| Classification | Food Emulsifier |
|---|---|
| Form at or about 77° | Clear, Golden Liquid |
| Melting Point | Approx. 45° |
| Iodine Value | Approx. 39° |
| Flash Point | Above 300° |
| Fire Point | Above 300° |
| Total Monoglycerides | Approx. 32% |
| Hydrophile-Lipophile Balance Rating | 8.1 |
| Monoglyceride Content (Alpha Form, %) | 28.0 min. |
| Free Glycerin, % | 1.1 max. |
| Free Fatty Acid (as oleic, %) | 1.0 max. |

The liquid emulsifier is known to be soluble at low levels in vegetable oils as well as being dispersible in water.

The monoglyceride and diglyceride components of the liquid emulsifier used in the liquid composition of the present invention are derived from animal fats and/or vegetable oils. The polysorbate component is preferably derived from the reaction of ethylene oxide and the sorbitan ester or stearic acid, e.g., polyoxyethylene (20) sorbitan monostearate. This particular polysorbate is commercially known as polysorbate 60. The monoglycerides and diglycerides preferably comprise from about 3.5 percent to about 9.0 percent by weight of the liquid composition while the polysorbate preferably comprises from about 2.5 percent to about 6.5 percent by weight of the liquid composition. Preferably, the ratio of the mono- and diglyceride components to the polysorbate component is less than 1.5 but more than 1.4.

The only commercially available liquid emulsifier currently known in the art is produced by ICI Americas, Inc., Specialty Chemicals Division, Wilmington, Del. 19897, under the name of TANDEM ®552. These blends contain a ratio of approximately 60 percent by weight of the mono- and diglycerides portion to approximately 40 percent by weight of the polysorbate component. As currently manufactured, TANDEM ®552 contains approximately 53 percent by weight mono- and diglycerides, 36 percent by weight polysorbate (60), and 11 percent by weight water. However, TANDEM ®552 cannot be applied directly to the surface of the dough without causing streaking or spotting in the color of the dough as it bakes. As previously mentioned, this unappetizing effect is unacceptable to the baking industry. In addition, hydraulic or air pressure spray equipment commonly used in bakeries cannot be used to spray TANDEM ®552 due to its viscosity.

To ensure that the liquid compositions of the present invention do not discolor the dough as it bakes, the compositions comprise a major portion of water by weight, specifically at least about 80 percent water by weight, and preferably between 83 percent and 93 percent water by weight as shown by the following examples. When a commercial liquid emulsifier which contains a limited amount of water is used, such as TANDEM ®552, the amount of water added thereto is preferably within the range of five to fourteen times by weight of the liquid emulsifier component, resulting in a liquid composition having at least 80 percent water by weight as in the examples which follow. Thus, they can be used to adhere a topping material to the dough surface as well as be sprayed directly onto the pan surfaces to provide good product release. It should be noted, however, that if excessive (and economically wasteful) amounts are sprayed directly onto the dough, some discoloring may occur.

As previously mentioned, unbleached liquid lecithin as derived from soya oils may also be added to the liquid composition in order to aid its adherence to high-walled baking pans, such as a bread pan. Lecithin also adds to the stability of the liquid composition. The lecithin comprises less than 4.0 percent by weight of the liquid composition and preferably about 2.0 percent in those liquid compositions used with high-walled pans.

To form a composition having a shelf life of more than a few days, certain preservatives should be added to the liquid composition. In particular, it has been found that the addition of potassium sorbate in an amount ranging from about 0.1 to about 0.2 percent by weight of the water and liquid emulsifier components, together with citric acid in an amount ranging from about 0.015 to about 0.3 percent by weight of the water and liquid emulsifier components provides a stable solution having a shelf life of at least two to three weeks when kept at a temperature between about 33° F. and about 110° F. for storage. Preferably, the liquid composition is stored and used at room temperature to prolong its shelf life. The stabilization of the liquid composition is also aided by preferably maintaining its pH between about 3.75 and 4.0. In particular, the potassium sorbate is not as effective at a pH greater than about 5.0 while a more acidic pH than about 3.75 results in a sharp odor emanating from the liquid composition.

A preferred method of preparing the liquid compositions of the present invention is to first place the water component under rapid agitation using a high-shear mixer, such as a Turbon High-Speed, High-Shear Mixer having a speed of about 3450 rpm (available from Tobert Industries, Inc., in South Bridge, Mass.). If the speed of the high-shear mixer is much greater than 3450 rpm, the liquid composition will become foamy due to the presence of too much air. However, mixer speeds which are much less than 3450 rpm have been found not to thoroughly mix the liquid composition. In addition, if a high-shear mixer is not used, the liquid composition has a tendency to separate into its different components after a few days. The water may be at ambient temperatures, ranging from about 56° F. to about 90° F. If potassium sorbate and citric acid are used as preservatives, they are slowly added to the agitating water component until the solution is thoroughly mixed, usually about 3 to 5 minutes. The liquid emulsifier component is then slowly added thereto while the agitation continues, and the resulting mixture is then thoroughly agitated for approximately 5 minutes to ensure a homogeneous solution. The liquid emulsifier is added to the water to prevent the formation of lumps which have a tendency to form when water is added to the liquid emulsifier.

If lecithin is to be added to the liquid composition of the present invention, the lecithin and the liquid emulsifier are first pre-mixed at ambient temperatures using a high-shear mixer, usually for about 3 to 5 minutes, until these components are thoroughly mixed and form a stable solution. This mixture is then added to the water component as stated above. Should the lecithin be introduced into the water rather than the liquid emulsifier, a lumpy mixture may result with much of the lecithin eventually separating out and floating to the top of the mixture. The resulting liquid composition which incorporates lecithin has a creamy color and a viscosity such that it may be sprayed using standard pressure spray apparatus, such as hydraulic or air pressure spray equipment. The resulting liquid composition without lecithin may be similarly sprayed but is a milky white opaque solution which is slightly less stable than those compositions incorporating lecithin. However, liquid compositions without lecithin are particularly useful with bun pans or the like which do not have the deep pan walls found in a bread pan, as well as in adhering a topping material to the dough surface.

The preferred liquid composition used in the method of the present invention for the release of baked breads from a bread pan is set forth in Example 1 below. This liquid composition has an approximate ratio of 6 parts water to 1 part liquid emulsifier, with the liquid emulsifier comprising about 12.4 percent by weight of the composition, and about 2.0 percent by weight lecithin is added. Potassium sorbate and citric acid may also be added to the liquid composition as preservatives. This liquid composition is particularly effective with baking pans having deep or high walls such as a bread pan. The liquid composition is generally sprayed directly onto the empty pan until complete coverage of all the surfaces of the pan which the dough will contact is obtained.

When the liquid compositions disclosed in the method of the present invention are used for the release of buns or the like from their baking pans, the lecithin component is not necessary. However, the presence of lecithin does aid the stability of the liquid composition. Thus, a preferred liquid composition for this use may be obtained by diluting the liquid composition of Example 1 with equal parts water to produce a liquid composition having an approximate ratio of about 12 to 13 parts water to each part liquid emulsifier. Such a preferred composition is disclosed in Example 2. This liquid composition is also preferred where a topping material is to be adhered to the dough surface before, during, and after the baking process.

The liquid compositions of the present invention are either sprayed onto the pan before the dough is placed in it, or sprayed onto the dough in the pan before the dough is fully proofed, i.e., risen. It has been found that if the dough has been fully proofed, the areas of the pan where the sticking of the dough primarily occurs are already covered by the dough. Consequently, the spray cannot reach and coat these areas. However, where a topping material is to be adhered to the dough, the liquid composition need not be sprayed onto the pans before the dough is placed therein. Rather, it has been found that spraying the liquid composition only after the dough is in the pan so that it covers the remaining surfaces of the pan which the dough will contact as it rises, as well as covering the surface of the dough itself, provides satisfactory release of the baked dough from the pan. Although not necessary, if desired, the pan may also be sprayed before the dough is placed therein to provide complete coverage of all the pan surfaces. As previously noted, however, it is important that an excessive amount of the liquid composition not be sprayed directly onto the dough in order to avoid the possibility of any discoloration of the baked dough.

The liquid composition is sprayed onto the baking pans by means of spray heads or nozzles known in the art, e.g., those used when water is used as the means for adhering the topping material onto the dough. The spray nozzles are connected to a hydraulic or air pump or a mechanical centrifugal pump which can provide a constant fluid pressure of about 40 lbs. to about 100 lbs. Suitable hydraulic pumps are well known in the baking industry under the trade names "GRACO" and "ALEMITE". The pumps draw the liquid composition directly from the steel drums in which it is stored.

The following nonlimiting examples of the liquid compositions of the present invention are provided for illustration only in order to further describe the liquid compositions of this invention.

| COMPOSITION | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| Liquid Emulsifier | | | | | | | | | |
| Mono- and Diglycerides | 7.4 | 4.0 | 7.5 | 5.8 | 8.8 | 7.3 | 4.4 | 4.7 | 6.5 |
| Polysorbates | 5.0 | 2.7 | 5.1 | 4.0 | 6.0 | 5.0 | 3.0 | 3.2 | 4.4 |
| *Water | 85.6 | 92.3 | 86.9 | 89.2 | 85.2 | 84.7 | 92.6 | 90.1 | 87.1 |
| Lecithin | 2.0 | 1.0 | 0.5 | 1.0 | | 3.0 | | 2.0 | 2.0 |

*Includes water incorporated with the liquid emulsifier.

In each of the above examples, the amount of water referred to is the total water in the liquid composition. However, when TANDEM ®552 is used as the liquid emulsifier, it already contains between about 10 percent to about 11 percent weight water. Accordingly, the above stated percentages of water include 11 percent for the water contained in the TANDEM ®552.

While the preferred application of this invention has been shown and described, it would be apparent to those skilled in the art that many more modifications in the specific formulas of the liquid compositions are possible without department from the inventive concept herein described. The invention, therefore, is to be limited only by the lawful scope of the claims which follows.

I claim:

1. A liquid composition for use as a pan-release agent in bakeries, consisting essentially of a liquid emulsifier containing monoglycerides, diglycerides, and a polysorbate, and at least about 80 percent water by weight of the liquid composition.

2. A liquid composition as in claim 1 wherein said liquid composition additionally includes an effective amount of lecithin to aid the adherence of the liquid composition and/or to add to the stability thereof.

3. A liquid composition as in claim 2 wherein the lecithin comprises less than about 4.0 percent by weight of the liquid composition.

4. A liquid composition as in claim 1 wherein the water comprises from about 5 to about 14 times by weight of the liquid emulsifier.

5. A liquid composition as in claim 1 wherein the water comprises from about 83 percent to about 93 percent by weight of the liquid composition.

6. The composition of claim 1 wherein the ratio of the mono and diglycerides to the polysorbate is no more than 1.5 and no less than 1.4.

7. A liquid composition for use as a pan-release agent in bakeries comprising a liquid emulsifier containing from about 4 to about 9 percent monoglycerides and diglycerides based on the total weight of the liquid composition and from about 2 to about 7 percent polysorbate by weight of the liquid composition, from about 0 to about 4 percent lecithin by weight of the liquid composition, and from about 80 percent to about 95 percent water based on the weight of the liquid composition.

8. A liquid composition as in claim 7 wherein said liquid composition comprises about 7.4 percent by weight monoglycerides and diglycerides, about 5.0 percent by weight polysorbate, about 2.0 percent by weight lecithin, and about 85.6 percent by weight water.

9. A liquid composition as in claim 7 wherein the liquid composition comprises about 4.0 percent by weight monoglycerides and diglycerides, about 2.7 percent by weight polysorbate, about 1.0 percent by weight lecithin, and about 92.3 percent by weight water.

10. A liquid composition as in claim 1 or 7 wherein the monoglycerides and diglycerides are derived solely from vegetable oils.

11. A liquid composition as in claim 1 or 7 wherein the polysorbate is derived from the reaction of ethylene oxide and the sorbitan ester of stearic acid.

12. A method of mixing a liquid composition consisting essentially of a liquid emulsifier containing monoglycerides, diglycerides, and a polysorbate, and at least 80 percent to about 95 percent water based on the total weight of the liquid composition which comprises the steps of:
   agitating the water in a high-shear mixer having a speed of about 3450 rpm;
   adding the liquid emulsifier to the water while the water is being agitated; and
   further agitating the water and the liquid emulsifier in the high-shear mixer until they form a stable, homogeneous solution.

13. A method of mixing a liquid composition as in claim 12 wherein the method further includes mixing an effective amount of lecithin to aid the adherence of the liquid composition and/or to add to the stability thereof, with the liquid emulsifier before it is added to the water.

* * * * *